(12) United States Patent
Kemp

(10) Patent No.: US 6,922,993 B2
(45) Date of Patent: Aug. 2, 2005

(54) APPARATUS FOR DERIVING ENERGY FROM WAVES

(76) Inventor: John Frederick Kemp, The Old Coach House, The Street, Patching, West Sussex (GB), BN13 3XF ( * ) Notice: Subject to any disclaimer, the term of this patent is extended or adjusted under 35 U.S.C. 154(b) by 0 days.

(21) Appl. No.: 10/030,237

(22) PCT Filed: Feb. 28, 2001

(86) PCT No.: PCT/GB01/01012

§ 371 (c)(1), (2), (4) Date: May 23, 2002

(87) PCT Pub. No.: WO01/65112

PCT Pub. Date: Sep. 7, 2001

(65) Prior Publication Data

US 2002/0152749 A1 Oct. 24, 2002

(30) Foreign Application Priority Data

Mar. 2, 2000 (GB) .............................. 0004940

(51) Int. Cl.[7] .............................................. F03C 1/00
(52) U.S. Cl. .......................................... 60/495; 60/496
(58) Field of Search .................................... 60/495, 496

(56) References Cited

U.S. PATENT DOCUMENTS

| 1,331,209 A | 2/1920 | Phillips |
| 1,418,680 A | 6/1922 | Scott |
| 3,149,776 A | 9/1964 | Parrish ........................ 230/84 |
| 3,685,291 A | 8/1972 | Fadden, Jr. ................. 60/57 T |
| 3,916,626 A | * 11/1975 | Schur .......................... 60/496 |
| 4,036,563 A | 7/1977 | Tornkvist .................... 417/331 |
| 4,078,871 A | * 3/1978 | Perkins, Jr. ................ 417/100 |
| 4,172,689 A | 10/1979 | Thorsheim ..................... 415/7 |
| 4,288,985 A | * 9/1981 | Dyck .......................... 60/398 |
| 4,316,704 A | * 2/1982 | Heidt ......................... 417/100 |
| 4,317,046 A | * 2/1982 | Holmberg .................... 290/1 R |
| 4,603,551 A | * 8/1986 | Wood .......................... 60/496 |

FOREIGN PATENT DOCUMENTS

| DE | 3803570 A1 | 7/1988 |
| GB | 2 196 697 A | 5/1988 |
| JP | 58-85369 A | 5/1983 |

* cited by examiner

*Primary Examiner*—Hoang Nguyen
(74) *Attorney, Agent, or Firm*—Lahive & Cockfield, LLP; Anthony A. Laurentano, Esq.

(57) ABSTRACT

Apparatus for deriving energy from waves, the apparatus comprising a chamber (1) adapted to float in water but having a water plane area such that its vertical oscillating movement is substantially damped relative to the height of waves in the water in which it is floating, a chamber inlet port (5) at one end of the chamber adapted to face into a wavetrain, and vertical side plates (7A, 7B) delivering compressed air to a manifold and thence to an outlet port (9) and a baffle (8).

16 Claims, 2 Drawing Sheets

APPARATUS FOR DERIVING ENERGY FROM WAVES

RELATED APPLICATIONS

This application is a 35 U.S.C. 371 national stage filing of, and claims priority to, International Application No. PCT/GB01/01012, filed Feb. 28, 2001, which in turn claims priority to Great Britain Patent Application No. 0004940.3 filed on Mar. 2, 2000 in Great Britain. The contents of the aforementioned applications are hereby incorporated by reference.

The present invention relates to an apparatus for deriving energy from waves, particularly waves in the sea.

Devices for deriving energy from sea waves are known. Many of these devices use the vertical motion of waves to drive an oscillating column of air through a self-rectifying turbine. In other cases, waves are induced to break and the water channelled upwards tp replenish continuously an elevated reservoir. Most devices are sited on the shoreline or on the sea bed, and the construction needs to be very substantial to cope with the forces produced by the waves.

The invention seeks to derive energy from waves in a different manner by using the forward motion of a wave to compress the air between two wave peaks.

According to the present invention there is provided an apparatus for deriving energy from waves comprising a chamber adapted to float in water but having a water plane area such that its vertical oscillating movement is substantially damped relative to the height of waves in the water in which it is floating, a chamber inlet port at one end of the chamber adapted to face into a wavetrain, and vertical side plates delivering compressed air to a manifold and thence to an outlet port and a baffle.

In use waves travel through the inlet port and compress air in the wave troughs as each wave advances into the manifold and then hits the baffle whereby the compressed air is forced out of the outlet port to provide a source of energy.

Preferably the chamber is an elongate chamber.

The chamber may be formed from a pair of side walls spaced apart by a top plate.

One end of the side walls may be joined by an end wall and the other end of the side walls are spaced to provide the inlet port.

A bottom plate may span the side walls and the side walls may provide at least part of the buoyancy for the chamber.

The baffle may be provided adjacent the end wall, or the baffle may be provided by the end wall itself.

The baffle may taper towards the inlet port.

The chamber may include a pair of tapering side plates adjacent each side wall to compress the air entering in successive wave troughs.

The angle of taper of the side plates may be adjustable and they may be curved.

An internal ramp may be provided to form a base for the wave channel.

Preferably the compressed air outlet port is adjacent the baffle and the outlet may be mounted in the upper section of the compression manifold.

A wave water outlet may be provided in the chamber and may be adjacent the baffle.

Means may be provided to adjust the buoyancy of the chamber to adjust its height in the water to suit different wave conditions.

An embodiment of the present invention will now be described, by way of example, with reference to the accompanying drawings in which.

Figure 1:
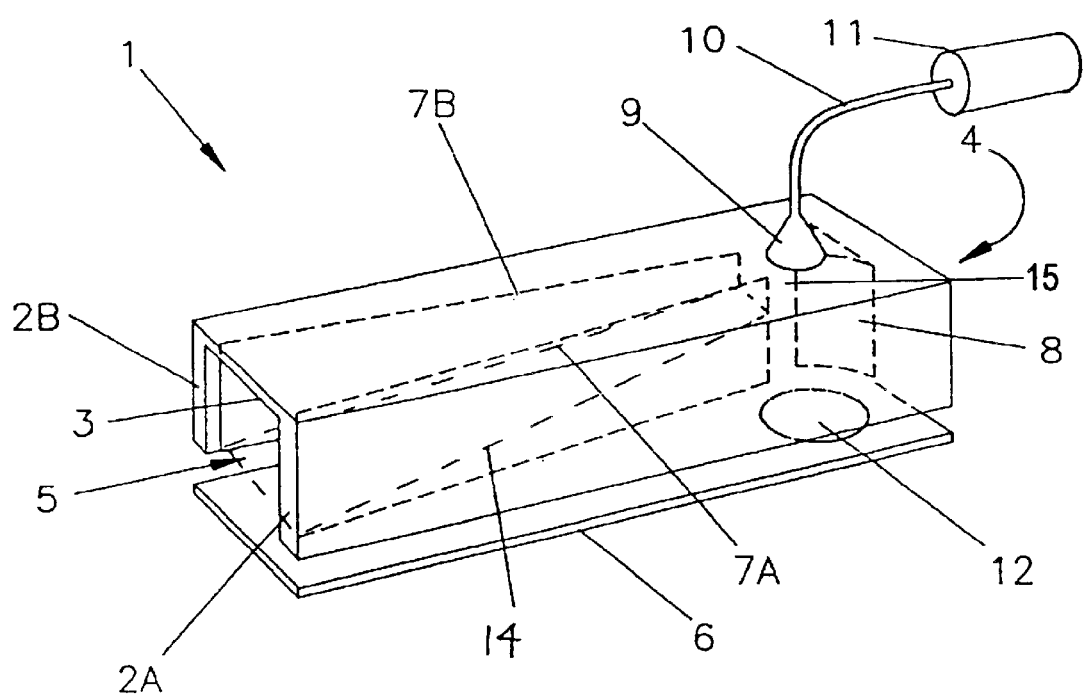
FIG. 1 shows a perspective view.

Referring to FIG. 1 there is shown an apparatus for deriving energy from waves. The apparatus has an elongate chamber 1 adapted to float in water. Chamber 1 is formed from a pair of side walls 2A, 2B spaced apart by a top plate 3. One end of the side walls are joined by an end wall 4 and the other end of side walls are spaced to provide an inlet port 5. A bottom plate 6 may span the edges of the side walls opposite the top plate 3.

Chamber 1 includes a pair of internal tapering side plates 7A, 7B (shown in dotted lines) adjacent each side wall 2A, 2B to compress laterally the air in a wave trough and deliver the compressed air to a manifold 15. The bottom of the channel may be the plate 6 or an inclined ramp 14.

A baffle 8 has the double function of restricting egress of air from the compression manifold 15 and dispersing remnant wave energy so that it is not reflected back along the chamber to interfere with the next incoming wave. The tapered sides of the baffle may be curved as shown.

An air outlet port 9 is mounted on the top plate 3 to which is attached an airflow pipe 10 connected to a prime mover 11. Outlet port 9 is in the compression manifold 15 adjacent the baffle, and between the baffle and the inlet port. Wave water outlets 12 are provided in the side walls 2A, 2B adjacent the baffle 8.

Figure 2A:
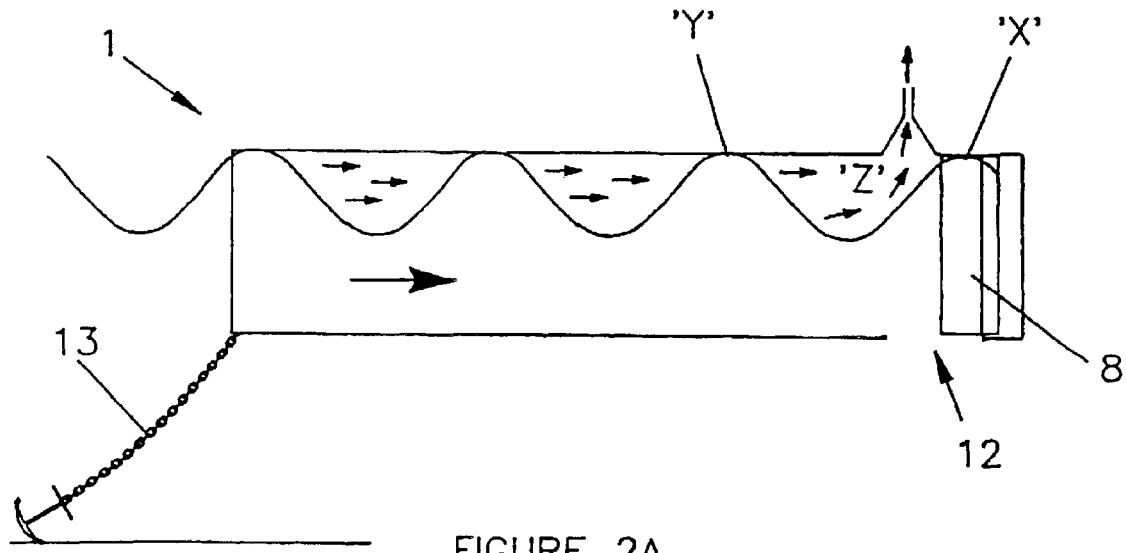
FIG. 2A shows a diagrammatic cross section view of waves in the chamber prior to air being compressed.
Figure 2B:
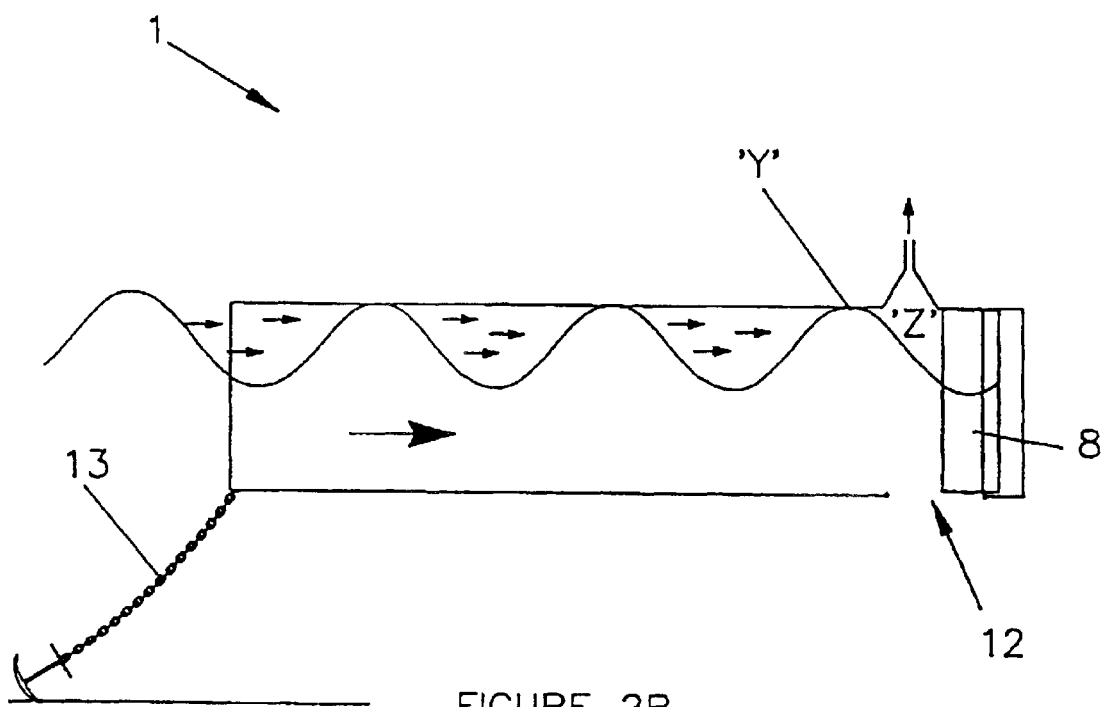
FIG. 2B shows a diagrammatic cross section view of waves in the chamber with air compressed.

Referring now to FIGS. 2A, 2B it will be seen that the chamber 1 may be anchored to the sea bed by anchor and chain 13. The chamber is tethered from the inlet port so that the inlet port always faces the wavetrain.

Buoyancy for the chamber 1 is provided mostly by the side walls 2A, 2B, but also by the end wall 4. The side and end walls have a small water plane area such that the vertical oscillating movement of chamber 1 is substantially damped relative to the height of waves in the water in which it is floating, In use waves travel through the inlet port and travel along the wave channel created by the side plates 7A, 7B towards the compression manifold 15 and the baffle 8. As seen in FIG. 2A a volume of air Z (in the trough behind a peak of wave X hitting the baffle and the following peak of wave Y) is fed into the manifold 15 under the outlet port 9. As wave Y moves towards baffle 8, the volume of air Z is compressed into the manifold by the wave Y and forced out through the outlet port 9. Each wave hitting the baffle 8 is reflected normal to the direction of the wave train to disperse the wave energy, and excess water under pressure passes through water outlet 12.

It will be appreciated that the air between any two waves entering the chamber 1 will be compressed in the manifold 15 and expelled through the aperture 9. The compressed air may be used to drive a prime mover 11 designed to generate energy. A non-return valve (not shown) may be positioned in the pipe 10 to take off air when it reaches a designated compression.

The invention may take a form different to that specifically described above. In particular the apparatus may be adjustable to suit different wave conditions. For example means may be provided to adjust the buoyancy of the chamber to adjust its height in the water to suit different wave heights, or means may be provided to adjust the angle of taper of the side plates 7A, 7B. It is thought that the taper of the side plates 7A, 7B may help to compress the air to increase the peak pressure of air driven out through the outlet port 9, and adjustment of the taper of plates 7A. 7B may serve to give compression ratios of e.g. between 2:1 to 6:1. The position of baffle 8 may be adjustable along the length of chamber 1, e.g. to suit different wavelengths. The bottom plate 6, or the ramp 14, may also be angled, and possibly adjustable like the side plates, to help compress the air.

Also the apparatus may be of a simpler construction. For example the side walls 2A, 2B may serve as a wave channel guide and the side plates 7A, 7B may not be required. The bottom plate 6 may not be required and the end wall 4 may serve as the baffle instead of there being a separate baffle.

It is envisaged that the apparatus of the invention may be produced in different sizes to suit different types of conditions, e.g. for estuary use or for ocean use. The prime mover 11 may generate electricity. Also two or more such apparatus may be interconnected to supply a single source of compressed air to a prime mover. The prime mover may be positioned on or remote from any chamber 1.

It is also envisaged that two similar apparatus may be connected back to back, possibly with a baffle unit in common. so that one delivers compressed air to a reservoir and the other extracts air to create a partial vacuum in a second reservoir. A prime mover may then be powered by the difference in pressure between the two reservoirs.

Because the chamber 1 may be anchored to the sea bed, the force on the chamber 1 is greatly reduced compared to hitherto known fixed constructions.

What is claimed is:

1. Apparatus for deriving energy from waves, the apparatus comprising
   - a chamber adapted to float in water but having a water plane area such that its vertical oscillating movement is substantially damped relative to the height of waves in the water in which it is floating,
   - a chamber inlet port at one end of the chamber adapted to face into a wavetrain,
   - a manifold located in the chamber opposite the chamber inlet port,
   - a baffle located in the chamber opposite the chamber inlet port to receive the water exiting the manifold, and
   - vertical side walls in the chamber delivering compressed air to the manifold and thence to an outlet port.

2. Apparatus as claimed in claim 1, in which, in use, waves travel through the inlet port and compress air in the wave troughs as each wave advances into the manifold and then hits the baffle whereby the compressed air is forced out of the outlet port to provide a source of energy.

3. Apparatus as claimed in claim 1, in which the chamber is an elongate chamber.

4. Apparatus as claimed in any preceding claim 1, in which the chamber is formed from a pair of side walls spaced apart by a top plate.

5. Apparatus as claimed in claim 4, in which one end of the side walls is joined by an end wall and the other end of the side walls are spaced to provide the inlet port.

6. Apparatus as claimed in claim 5, in which a bottom plate spans the side walls and the side walls provide at least part of the buoyancy for the chamber.

7. Apparatus as claimed in claim 5, or in which the baffle is provided adjacent the end wall.

8. Apparatus as claimed in claim 1, in which the baffle tapers towards the inlet port.

9. Apparatus as claimed in claim 1, in which the chamber includes a pair of tapering side plates adjacent each side wall to compress the air entering in successive wave troughs.

10. Apparatus as claimed in claim 9, in which the angle of taper of the side plates is adjustable.

11. Apparatus as claimed in claim 1, in which an internal ramp is provided between the inlet port and the manifold.

12. Apparatus as claimed in claim 11, in which the angle of the ramp is adjustable.

13. Apparatus as claimed in claim 1, in which the air outlet port leads off the manifold adjacent the baffle.

14. Apparatus as claimed in any preceding claim 1, in which a wave water outlet is provided in the chamber adjacent the baffle.

15. Apparatus as claimed in claim 1, in which means are provided to adjust the buoyancy of the chamber to adjust its height in the water to suit different wave conditions.

16. Apparatus for deriving energy from waves, the apparatus comprising
    - a chamber adapted to float in water but having a water plane area such that its vertical oscillating movement is substantially damped relative to the height of waves in the water in which it is floating,
    - a chamber inlet port at one end of the chamber adapted to face into a wavetrain,
    - a manifold in the chamber at the end of the chamber remote from the inlet port,
    - an outlet port in the manifold,
    - a baffle in the manifold, and
    - vertical side plates in the chamber whereby waves advancing horizontally through the chamber are induced to compress air in their troughs and deliver compressed air to the manifold and thence to the manifold outlet port.

\* \* \* \* \*